United States Patent [19]

Dickerson

[11] 4,196,463

[45] Apr. 1, 1980

[54] METHOD AND APPARATUS FOR DETECTING FAULTS IN AN ELECTRIC POWER DISTRIBUTION SYSTEM

[75] Inventor: Arthur F. Dickerson, Woodland Hills, Calif.

[73] Assignee: Hughes Aircraft Company, Culver City, Calif.

[21] Appl. No.: 912,663

[22] Filed: Jun. 5, 1978

[51] Int. Cl.² .............................................. H02H 3/26
[52] U.S. Cl. ..................................... 361/113; 361/85; 361/87
[58] Field of Search .................. 361/113, 76, 77, 85, 361/86, 87, 88, 42, 44, 47–50, 82, 93, 94, 110, 111, 182, 184, 17, 35, 36; 340/658; 324/107, 78F

[56] References Cited

U.S. PATENT DOCUMENTS

| | | | |
|---|---|---|---|
| 2,120,855 | 6/1938 | Buell | 361/110 X |
| 3,013,185 | 12/1961 | Forsyth et al. | 361/85 |
| 3,284,673 | 11/1966 | Shimada | 361/184 X |
| 3,308,345 | 3/1967 | Warrington | 361/44 |
| 3,515,943 | 6/1970 | Warrington | 361/113 |

Primary Examiner—Patrick R. Salce
Attorney, Agent, or Firm—Allen A. Dicke, Jr.; W. H. MacAllister

[57] ABSTRACT

Open conductors in an electric power distribution system are detected by sensing the abrupt change in balance of transformer magnetizing current among phases, particularly the third harmonic of the power system frequency. The current is sensed in each phase and the absolute magnitude of the third harmonic current is compared among the phases. When imbalance exceeds a predetermined value, a signal is produced.

18 Claims, 3 Drawing Figures

METHOD AND APPARATUS FOR DETECTING FAULTS IN AN ELECTRIC POWER DISTRIBUTION SYSTEM

BACKGROUND OF THE INVENTION

This invention is directed to a method and apparatus for sensing open conductors in a multiphase electric power distribution system by comparing the third harmonic current in the phases.

Fault protection of electric power systems is a well-developed, well corrdinated practice. Under most circumstances, the protective system responds rapidly to the sudden and sometimes violent changes of system operation caused by short circuits. The fault is automatically cleared in order that the large current flows and accompanying release of large amounts of energy do not cause system damage and long customer outages.

Over-current sensing is often the primary means used for system protection because over-currents impose the major electrical and mechanical stresses on the system. However, under certain circumstances faults on distribution systems, especially 4,160 volt to 13,800 volt curcuits do not cause high current flow and therefore are not adequately handled by existing protection devices and systems. Such high impedance faults are usually caused by broken and downed conductors. These faults do not generally result in wide-spread damage to the system, but if they are not rapidly de-energized can result in personal hazard. A broken conductor which is lying on the ground may be fully energized but not arcing and hence have a deceptively benign appearance. The resultant hazard of bodily injury is very great.

One power company reported 390 fallen 12 kilovolt conductors in one 18 month period. In about ⅓ of the cases, the protective system failed to clear the fault. The power system thus had about 80 cases each year of energized conductors which were downed. About ¼ of these involve bare wire. From this data, it can be seen that a considerable hazard to personal injury exists.

It is thus seen that a protective device which can discriminate the broken conductor faults and de-energize the circuit within a sufficiently short time to limit hazards is required. Such a circuit device must have reliability, selectivity, stability, speed and sensitivity consistent with its function and relationship to the entire protection system. The device should be capable of being conveniently installed in circuit breaker or recloser control cabinets to minimize communication requirements and make use of existing sensors. It must also be cost effective in its installation and use because of the large number of locations within the system which would require its use.

Van Cortlandt Warrington U.S. Pat. No. 3,308,345 is directed to an electrical fault detector for detecting fault currents which have an appreciable harmonic content. That patentee finds that faults which are manifested by the occurrence of arc discharges, or passage of current through a non-linear resistance such as a broken power supply conductor which is lying on the ground, or incipient faults in wooden pole mounted conductors have appreciable harmonic content. That patentee teaches the filtering out of the fundamental and the second and third harmonic frequency components and using the fourth and higher harmonics for the sensing of faults. When the fourth and higher harmonic frequency content of the voltage signal exceeds a certain magnitude, that system signals a fault. The essential requirement of the Van Cortlandt Warrington Patent is that a current flows in the fault. The present invention addresses the case where little or no current flows in the fault.

SUMMARY OF THE INVENTION

In order to aid in the understanding of this invention, it can be stated in essentially summary form that it is directed to a method and apparatus for detecting faults in an electric power distribution system wherein the third harmonic current can be compared between the phases to signal open conductors in the distribution system.

It is thus an object of this invention to provide a method for detecting faults in an electric power distribution system. It is an other object to provide an apparatus which operates in accordance with the method. It is a further object to provide a device which can reliably and economically detect high impedance faults on distribution circuits without interfering with existing protection methods and equipment. It is another object to provide a detection method and apparatus which has reliability, selectivity, stability, speed and sensitivity consistent with its function in relationship to the entire protection scheme. It is a further object to provide a detection apparatus and method which is cost effective in its installation and operation so that it is useful in a large number of locations to provide wide-spread protection. It is a further object to provide a detecting device which is capable of being employed with existing equipment in order to minimize interconnection and equipment cost.

Other objects and advantages of this invention will become apparent from the study of the following portion of the specification, the claims and the attached drawings.

DESCRIPTION OF THE PREFERRED EMBODIMENT

Figure 1:
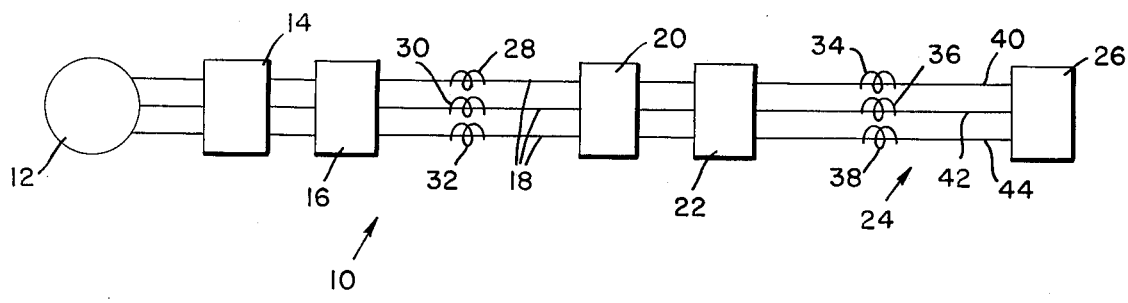
FIG. 1 is a schematic circuit drawing showing a power system in which the apparatus for detecting faults in accordance with this invention is incorporated.
Figure 2:
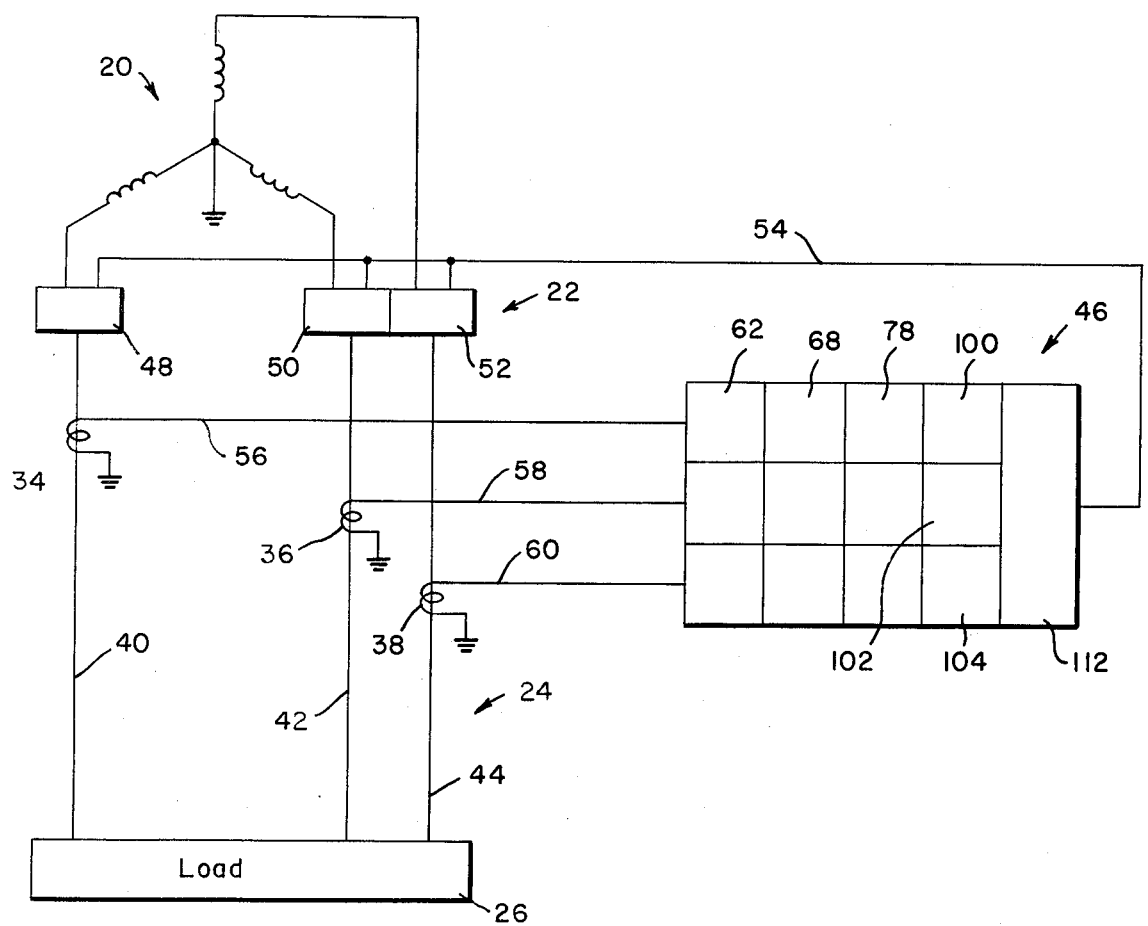
FIG. 2 is a block diagram arrangement of the fault detection apparatus shown in connection with a distribution circuit.

FIG. 1 shows a distribution system 10 which incorporates the apparatus for detecting faults in accordance with this invention. The distribution system 10 comprises a multiphase source 12, such as a three-phase generator. The output of the source 12 goes to a transformer 14 which delivers power through a breaker 16 to a transmission line network 18. The transmission line network 18 represent the transmission of power from the generation site to the area where it will be distributed. At a distribution point on the transmission line network 18, a transformer 20 reduces the voltage to local distribution potential. A circuit breaker or recloser 22 protects the transformer 20 and controls a set of distribution lines 24. The transformer 20 usually supplies a plurality of distribution lines of which the lines 24 are an example. The distribution lines 24 feed a load 26, which may be an ultimate load or may be a local distribution transformer. In normal practice, a plurality of such loads may be connected to a single distribution line, and each usually has its protection in the form of a breaker or recloser. Both the transmission line network 18 and the distribution line 24 are subject to fault sensing so that the breakers 16 and 22 can disconnect the faulted line to protect the equipment toward the source and to prevent the discharge of large amounts of energy into the fault. To effect such control, sensors are associated with the distribution lines at the outputs of the breakers. For example, a set of sensors 28, 30 and 32 is associated with the three phase lines of transmission line network 18 and are located just at the outlet of the breaker 16. In view of the higher voltage and other considerations, sensing of open lines is not often needed on high voltage transmission lines, but is included herein as an example. Furthermore, the sensors 34, 36 and 38 are associated with a set of three phase lines 40, 42 and 44 of the distribution line 24. Since the method and apparatus for detecting faults in accordance with this invention is more needed in connection with the local distribution lines at moderate voltage, FIG. 2 illustrates the detecting apparatus 46 in accordance with this invention in connection with the distribution line 24. It is understood, however, that the detecting apparatus can be employed at other parts in the system, for example, for the transmission line 18 for which the sensors 28, 30 and 32 are employed, or within distribution line 24 where subsidiary breakers or reclosers may be located, or at the load point itself.

FIG. 2 shows the detecting apparatus and the associated portion of the power distribution system mostly in block diagram form. The transformer 20 is shown as being a Y-connected secondary with grounded center tap although other configurations may be employed. The breaker or recloser 22 is shown as a separate breaker unit between the transformer outputs and the distribution lines. A set of breaker units 48, 50 and 52 is shown. The breaker units may represent contacts in the same breaker housing. Furthermore, the breaker 22 may be a recloser. Each of the breaker units is controlled by a control line 54 which carries the output signal from the detecting apparatus 48 in addition to the normal over-current detecting devices.

Input signals from the three distribution lines 40, 42 and 44 are respectively supplied by the current transformers 34, 36 and 38 which have a current signal in a set of input signal lines 56, 58 and 60. These input signal lines feed three logic lines, the structure and operation of which is similar. The logic is symmetrical for the three phases so that only one logic channel need be described. The upper logic channel shown in FIG. 2 is the one described below, and is the one shown in further detail in FIG. 3. As seen in FIG. 2, the senser 34 delivers a current to a resistor wherein the voltage is proportional to the current in the distribution line 40 and delivers the voltage to the input signal lines 56. The input signal line 56 is connected to a stop filter 62 by means of the coaxial cable illustrated in FIG. 3. Such a cable reduces electromagnetic interference with the signal. The signal is delivered to a twin T filter 64 which acts as a stop for the fundamental wave, 60 Hz in accordance with this particular example. The signal from the stop filter 62 passes to the positive terminal of an operational amplifier 66 which forms a part of a third harmonic pass filter 68. The output of the operational amplifier 66 is connected through a frequency selective network to the negative terminal of the operational amplifier 66 to accomplish the passage of the third harmonic or 180 Hz wave. The ratio of a resistance 72 to a resistance 74 determines the gain of the amplifier 66 at the third harmonic frequency. A test of the structure showed a 57 db separation at test point 76 between equal amplitude inputs of the third harmonic signal and the fundamental wave. Such separation is sufficient for the requirements of this detecting apparatus.

A rectifier section 78 receives a signal between a set of series connected rectifiers 80 and 82. The rectifier 80 is connected to ground and the output of the rectifier 82 is connected to an operational amplifier 84. The rectifiers 80 and 82 act as a voltage doubler and with the rectifier 80 being referenced to ground, this circuit also eliminates any dc offset which might appear at the test point 76. A set of resistors 86 and 88 determine the charging and discharging time constant of a capacitor 89. The capacitor 89 acts as a preliminary delay to prevent signal spikes from passing down the line. The operational amplifier 84 is connected as a unity gain non-inverting amplifier to provide a low impedance source for the subsequent circuitry. A junction 90 at the output of the operational amplifier 84 delivers the signal through a diode 92 to a capacitor 94. Positive bias is fed from a bias source 96 through a resistor 98 to charge a capacitor 94. This acts as a time delay in cases where the positive going, increased third harmonic signal, is present. Its function will be later described in more detail.

An adder 100 receives the signal from the rectifier section 78 as well as from the parallel rectifier sections below it. Similarly, an adder 102 and an adder 104 are connected to receive all three signals. The adder 100 has an operational amplifier 106 which has the signal from the capacitor 94 connected through a scaling resistance to a negative input. The signals from the other two rectifier sections are scaled by suitable resistors and are connected to the positive terminal of an operational amplifier 106. The result of this is that an output signal point 108 has an output which corresponds to the output of the rectifier section 78 minus half the output of the rectifier section immediately below and half the output of the rectifier section shown at the bottom of the stack. The adder 100 is thus a straight forward analog adder. The adder 102 adds the voltage output of the center rectifier section minus half the voltage of the rectifier section 78 minus half the voltage output of the lower-most rectifier section. The adder section 104 adds the voltage output of the lower-most rectifier section minus half the voltage of the center rectifier section and half the voltage of the rectifier section 78. The outputs of the adders are connected together through diodes to an output line 110. An increase of the signal voltage on line 110 results from a unilateral decrease of the third harmonic signal in any one of the three parallel channels.

The output line 110 is connected to a trip circuit 112. The trip circuit 112 has an output when its input signal from the line 110 exceeds a reference voltage. The signal line 110 is connected to the positive terminal of an operational amplifier 114, while the negative terminal has a fixed value applied thereto. A bias source 116 is connected to the negative input of the operational amplifier 114, and the voltage thereto is controlled by a Zener diode 118. A potentiometer 120 serves as a sensitivity control. A resistor 122 and a capacitor 124 determines the time delay of the trip signal. The circuitry embodying the operational amplifier 114 and the feedback through a normally open switch 126 provides a simple latch and reset function. A light emitting diode 128 provides an indicator light when the operational amplifier 114 is latched in the trip position when the system has been tripped by excessive third harmonic, indicating a fault. The output of the operational amplifier 114 is thus the signal to cause tripping in a set of breakers 148, 150 and 152 and is connected to the output line 54.

Figure 3:
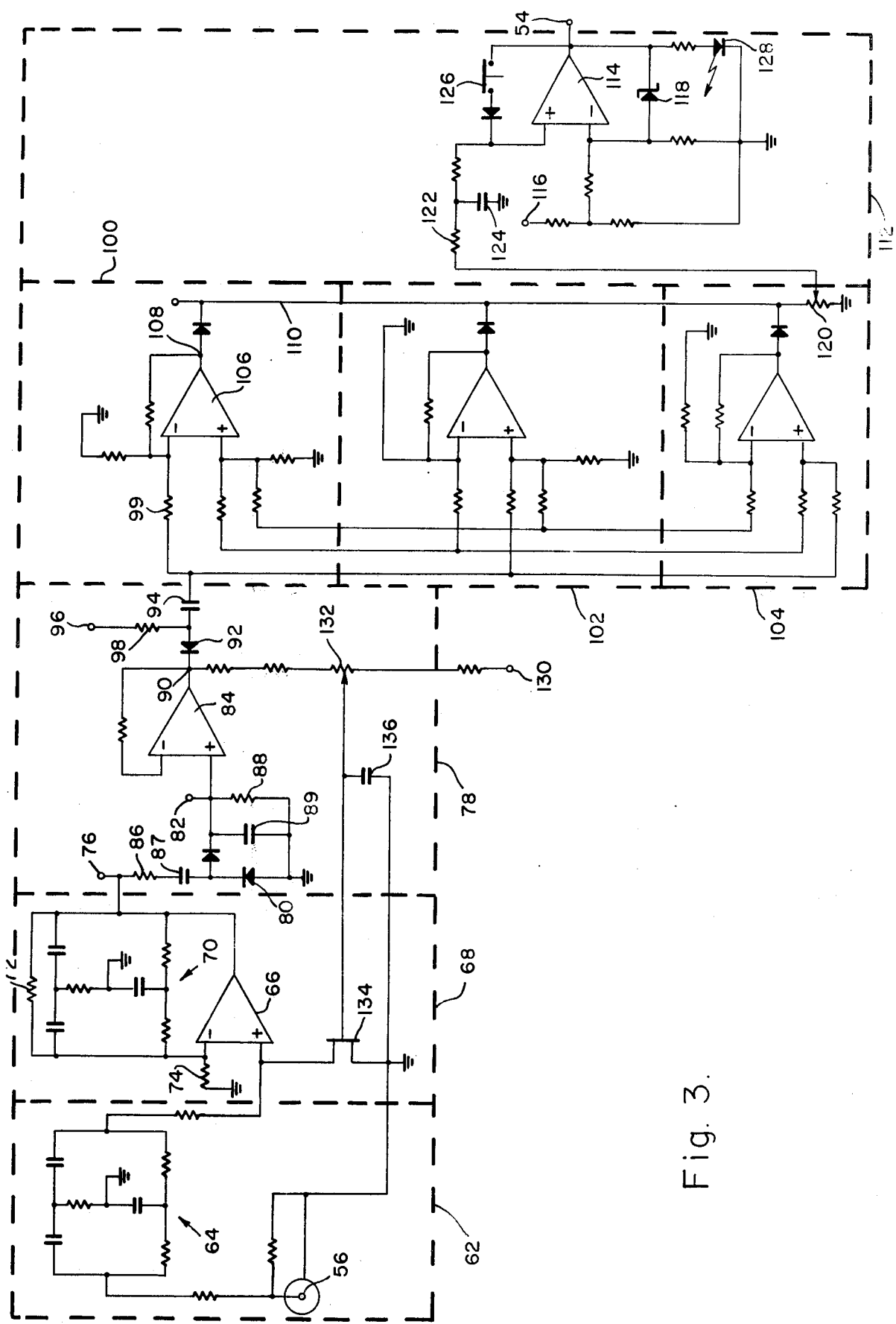
FIG. 3 is a schematic electrical drawing of the detecting apparatus in accordance with this invention.

Automatic gain control of each channel is desirable to overcome the results of normal system changes. For example, the connection of a substantial load or a new transformer may change the distribution circuit characteristics sufficiently to bring the third harmonic to a point where it would indicate the existence of a fault, when no such fault occurs. Accordingly, the employment of an automatic gain control provides a device which is applicable to a distribution circuit without initial adjustment, and is capable of adapting to the circuit as it changes. To accomplish this, a bias source 130, see FIG. 3, is connected through a potentiometer 132 and scaling resistors to the junction 90. The output of the potentiometer 132 is connected to the gate of a field effect transistor 134, and is also connected through a capacitor 136 to ground. The capacitor 136 controls the rate at which the gate voltage can change. The field effect transistor 134 is connected between the positive terminal of the operational amplifier 66 and ground to control the level of the input signal to the operational amplifier 66. The field effect transistor 134 operates as a voltage controlled resistor, and the signal applied to its gate is a slowly varying dc control signal. For a small signal, the dynamic resistance from drain to ground is inversely proportional to the dc control signal. The control signal is proportional to the output of the operational amplifier 84 which is the input signal at the input signal line 56 times the channel gain through the operational amplifier 84. The control dynamic resistance of the field effect transistor 134 in conjunction with the inline resistance to the positive terminal of the operational amplifier 66 slowly changes channel gain so as to keep the output of the operational amplifier 84 nearly constant for time changes longer than the time constant represented by the resistor string between the junction 90 and the bias source 130, and the capacitor 136. In the initial alignment the potentiometer 132 and the corresponding potentiometers in the other channels are adjusted to equalize the voltages at the junction 90 and the corresponding junctions in the other channels for equal 180 Hz inputs at the sensors 34, 36 and 38.

There are four key time constants embodied in the device. The first time constant is represented by the resistor 122 and the capacitor 124. This is the final trip delay time constant.

The second time constant is the preliminary trip delay and is represented by the resistor 88 and the capacitor 90.

The third is the gain control time delay produced by the resistor string between the junction 90 and the bias source 130, together with the capacitor 136.

The fourth time delay is the increased signal delay which is produced by the resistor 86 and the capacitor 87 and is also produced by the capacitor 94 and the resistors 98 and 99. It is intended that the first time delay be shorter than the second time delay which in turn is shorter that the third time delay and which is in turn shorter than the fourth time delay. The first time delay is simply for immunity to noise or impulses that enter the device through its power supply. The first time delay must be short with respect to the second time delay. The second time delay must be longer than the normal circuit breaker cycle, which is in the time region of 0.1–0.2 seconds, to avoid false trip signals during breaker operations. However, the second time delay determines the time that the open conductor remains energized and hence a hazard so it cannot be arbitrarily long. A time delay of one-half second can be implemented.

The purpose of the third time delay is to adjust to long-term changes in the power system itself which are part of normal operations. This time constant could hve values from five seconds to sixty seconds and upward.

The devide should not be sensitive to an increase in the third harmonic signal except on a basis that will permit gain adjustment. For example, the addition of a transformer on a single phase would cause an increase in the third harmonic, but should not cause a trip. However, the removal of a transformer would cause a decrease in the third harmonic which represents a disconnection and possibly a downed line, so that the decrease in third harmonic should cause a trip. The diode 92 in the quiescent state is lightly forward biased by the resistor 96 so that any negative-going signal which represents a decrease in the third harmonic is readily transmitted through the diode 92 and the capacitor 94 to the adders. Conversely, a positive-going signal representing an increase in the third harmonic will be blocked until the capacitor 94 can recharge. However, because the fourth time constant is larger than the third time constant, the gain control will reduce the signal more rapidly than the capacitor 94 can recharge. This effectively blinds the adder to the positive-going changes but retains sensitivity to negative-going signals.

From this description, it can be seen that the apparatus is eminently suitable fro detecting faults in electric power systems, and particularly faults represented by a decrease in the connected load. The description also covers a method for sensing faults which are represented by a decrease in connected load.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. An apparatus for detecting faults in a multiphase alternating current power system comprising:
   means connected to each phase for sensing the current in each phase conductor of the alternating current electric power system and for providing a phase signal related to phase current;
   means for processing each phase signal by stopping the fundamental frequency alternating current wave;
   means for processing each phase signal by passing substantially only the third harmonic wave; and
   means for comparing a signal representing the third harmonic wave of each phase with a reference signal representing the third harmonic wave of another phase so that when the signal representing the third harmonic wave of any phase compares unfavorably with the reference signal, a fault signal is emitted.

2. The apparatus for detecting faults in accordance with claim 1 wherein said means for comparing the third harmonic wave with a reference signal includes means for rectifying a signal corresponding to the third harmonic wave to extract an absolute magnitude signal corresponding to the third harmonic wave.

3. The apparatus for detecting faults in accordance with claim 2 wherein there are at least three phases in the alternating current electric power system and there is a means connected to each said phase for sensing the current in each phase, means for processing each phase signal by stopping the fundamental frequency therein and means for processing each said phase signal by passing substantially only the third harmonic wave with respect to each of said phases.

4. The apparatus for detecting faults in accordance with claim 1 wherein said means for comparing is responsive to the abrupt changes in the third harmonic signal.

5. The apparatus for detecting faults in accordance with claim 1 wherein said apparatus is connected into a system which includes a source of electric power, a circuit controller, a distribution system and a load, said sensor being connected between said circuit controller and said load and being connected to said circuit controller to operate said circuit controller upon detection of a fault represented by an increase in third harmonic circuit current.

6. An apparatus for detecting faults in a multiphase alternating current power system comprising:
   means connected to each phase for sensing the current in each phase conductor of the alternating current electric power system and for providing a phase signal relating to the phase current:
   means for processing each phase signal by stopping the fundamental frequency alternating current wave;
   means for processing each phase signal by passing substantially only the third harmonic wave;
   means for comparing a signal representing the third harmonic wave of each phase to a signal representing the third harmonic wave of each of the other phases including means for algebraic adding of the absolute magnitude signal and subtracting therefrom substantially half the absolute magnitude signals for each of the other two phases.

7. The apparatus for detecting faults in accordance with claim 6 wherein the largest signal from said means for adding is compared with a reference signal and a fault signal is emitted when the largest signal from said means for adding exceeds the refererence value.

8. An apparatus for detecting faults in a multiphase alternating current power system comprising:
   means connected to each phase for sensing the current in each phase conductor of the alternating current electric power system and for providing a phase signal related to the phase current;
   means for processing each phase signal by stopping the fundamental frequency alternating current wave;
   means for processing each phase signal by passing substantially only the third harmonic wave; and
   means for comparing a signal representing the third harmonic wave of each phase with a reference signal representing the third harmonic wave of another phase by algebraic adding of the absolute magnitude signal of each phase signal and subtracting therefrom a portion of the absolute magnitude signals for each of the other phase signals and further including means for comparing which is responsive to abrupt changes in the third harmonic signal.

9. The apparatus of claim 8 wherein said means for comparing includes a feedback circuit which provides long-term adjustment so that said means is insensitive to long-term changes and responds to abrupt changes in the third harmonic signal.

10. The apparatus for detecting faults in accordance with claim 9 wherein said apparatus is connected into a system which includes a source of electric power, a circuit controller, a distribution system and a load, said sensor being connected to detect current through said circuit controller and said load and being connected to said circuit controller to operate said circuit controller upon detection of a fault represented by an increase in third harmonic circuit current.

11. An apparatus for detecting faults in a multiphase alternating current electric power system comprising:
   a sensor for connection to each phase of the alternating current electric power system for sensing the current in each phase conductor;
   a fundamental wave stop filter connected to each said sensor for stopping the fundamental alternating current wave;
   a third harmonic pass filter connected to each said fundamental wave stop filter for passing a signal corresponding to substantially only the current in the third harmonic wave in the conductor;
   a rectifier connected to said third harmonic current wave pass filter for rectifying the signal to produce a direct current signal of varying voltage which is related to the third harmonic current wave in the conductor; and
   an analog adder connected to receive each of the recitified signals, each of said adders subtracting from that phase signal a fraction of the signal from each of the other phases to result in a comparison of the third harmonic signals between the phases to establish a maximum signal; and
   comparing means connected to said analog adder for comparing the maximum signal to a reference signal.

12. The apparatus for detecting faults in accordance with claim 11 wherein said means for comparing includes means responsive to abrupt changes in the third harmonic current signal.

13. The apparatus for detecting faults in electric power systems in accordance with claim 11 wherein said apparatus is connected into a system which includes a source of electric power, a circuit controller, a distribution system and a load, said sensor being connected between said circuit controller and said load and being connected to said circuit controller to operate said circuit controller upon detection of a fault represented by an increase in third harmonic circuit current.

14. The apparatus for detecting faults in accordance with claim 13 wherein said means for comparing includes means responsive to abrupt changes in the third harmonic current signal.

15. The method for detecting a fault in a multiphase alternating current electric power system comprising the steps of;
   sensing the current in each phase conductor between the source and a load to produce a phase signal;
   substantially stopping the fundamental wave in each phase signal in a filter;
   substantially passing only the third harmonic wave in each phase signal in a filter;

comparing a signal corresponding to the third harmonic wave in each phase signal to a reference signal which is comprised of the other phase signals; and emitting a fault signal when the third harmonic signal compares unfavorably to the reference signal.

16. The method for detecting a fault in accordance with claim 15 wherein the step of extracting the absolute magnitude of the third harmonic signal is performed after the third harmonic pass filtering step by rectifying the third harmonic wave signal to produce the corresponding signal.

17. The method for detecting a fault in a multiphase alternating current electric power system comprising the steps of:

sensing the current in each phase conductor between the source and a load to produce a phase signal;

substantially stopping the fundamental wave in each phase signal in a filter;

substantially passing only the third harmonic wave in each phase signal in a filter;

extracting the absolute magnitude of each third harmonic signal by rectifying each third harmonic wave signal to produce the corresponding absolute magnitude signals; and performing a step of algebraic analog addition for each of the corresponding signals for each phase by adding at each phase the corresponding signal of that phase and subtracting therefrom a portion of the corresponding signal for each of the other phases.

18. The method for detecting a fault in accordance with claim 17 wherein the comparing step includes comparing the highest result of the analog algebraic addition with a reference signal.

* * * * *